(12) United States Patent
Eames

(10) Patent No.: US 9,581,025 B2
(45) Date of Patent: Feb. 28, 2017

(54) AIRCRAFT POWER PLANT

(71) Applicant: Rolls-Royce Corporation, Indianapolis, IN (US)

(72) Inventor: David John Howard Eames, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 516 days.

(21) Appl. No.: 14/142,166

(22) Filed: Dec. 27, 2013

(65) Prior Publication Data

US 2014/0250861 A1 Sep. 11, 2014

Related U.S. Application Data

(60) Provisional application No. 61/775,554, filed on Mar. 9, 2013.

(51) Int. Cl.
*B64D 33/00* (2006.01)
*F02C 7/36* (2006.01)
(Continued)

(52) U.S. Cl.
CPC ............... *F01B 23/00* (2013.01); *B64D 27/02* (2013.01); *F02C 9/42* (2013.01); *F02C 9/44* (2013.01); *B64D 2027/005* (2013.01); *B64D 2027/026* (2013.01); *B64D 2033/0293* (2013.01); *B64D 2700/6285* (2013.01); *B64D 2700/62947* (2013.01); *F02C 7/36* (2013.01);
(Continued)

(58) Field of Classification Search
CPC ............... F02C 7/36; F02C 9/42; F02C 9/44; F02K 3/12; B64D 2700/62771–2700/62859
See application file for complete search history.

(56) References Cited

U.S. PATENT DOCUMENTS 1,394,870 A * 10/1921 Thomas ................ B64D 35/06
123/197.1
2,159,758 A 5/1939 Gunther
(Continued)

FOREIGN PATENT DOCUMENTS

DE 315109 C 8/1918
DE 728044 C 11/1942
(Continued)

OTHER PUBLICATIONS

International Search Report and Written Opinion, International Application No. PCT/US2013/076521, search completed May 21, 2014, 12 pages.
(Continued)

*Primary Examiner* — Phutthiwat Wongwian
*Assistant Examiner* — Rene Ford
(74) *Attorney, Agent, or Firm* — Barnes & Thornburg LLP

(57) ABSTRACT

An aircraft power plant is disclosed having a plurality of bladed rotors in flow communication driven by separate work producing devices. The work producing devices can take a variety of forms including an internal combustion engine and electric motor, for example. The bladed rotors can be associated with an aircraft pylon and can be driven independently to separate operating conditions to provide optimum performance. For example, the bladed rotors can be driven to separate operating conditions that improve a noise signature or performance of the aircraft.

20 Claims, 2 Drawing Sheets

(51) Int. Cl.
  *F01B 23/00* (2006.01)
  *F02C 9/44* (2006.01)
  *F02C 9/42* (2006.01)
  *B64D 27/02* (2006.01)
  B64D 33/02 (2006.01)
  B64D 27/00 (2006.01)
(52) U.S. Cl.
  CPC ........... *F05D 2270/13* (2013.01); *Y02T 50/64* (2013.01); *Y02T 50/66* (2013.01)

(56) References Cited

U.S. PATENT DOCUMENTS

| | | | | |
|---|---|---|---|---|
| 2,380,889 | A * | 7/1945 | Waseige | B64D 35/06 180/315 |
| 2,406,625 | A | 8/1946 | Oglesby | |
| 2,470,155 | A * | 5/1949 | Forsyth | B64D 35/06 244/60 |
| 2,518,841 | A * | 8/1950 | Vincent | B64D 35/06 244/60 |
| 2,581,320 | A * | 1/1952 | Burton | B64D 35/06 244/55 |
| 2,753,005 | A * | 7/1956 | Peterson | B64D 35/06 416/121 |
| 3,335,979 | A * | 8/1967 | Kurkjian | B64D 35/04 244/60 |
| 3,470,961 | A * | 10/1969 | Halsmer | B64D 35/06 416/125 |
| 3,622,105 | A * | 11/1971 | Buchholz | G05D 1/063 244/182 |
| 4,426,049 | A * | 1/1984 | Stewart | B64D 35/00 244/54 |
| 4,676,459 | A * | 6/1987 | Seefluth | B64C 11/48 244/60 |
| 4,955,561 | A * | 9/1990 | Seefluth | B64D 35/08 244/60 |
| 4,976,102 | A | 12/1990 | Taylor | |
| 5,079,916 | A | 1/1992 | Johnson | |
| 5,221,185 | A | 6/1993 | Pla et al. | |
| 6,279,852 | B1 * | 8/2001 | Dusserre-Telmon | B64D 35/08 244/60 |
| 2010/0047068 | A1 | 2/2010 | Parry et al. | |
| 2010/0155526 | A1 * | 6/2010 | Negulescu | B64D 27/08 244/55 |
| 2010/0202892 | A1 | 8/2010 | Perkinson | |
| 2010/0206982 | A1 | 8/2010 | Moore et al. | |
| 2011/0024567 | A1 | 2/2011 | Blackwelder et al. | |
| 2011/0056183 | A1 | 3/2011 | Sankrithi et al. | |
| 2011/0067412 | A1 | 3/2011 | Stretton | |
| 2011/0083416 | A1 | 4/2011 | Scothern | |
| 2012/0128487 | A1 * | 5/2012 | Eames | B64C 11/346 416/1 |

FOREIGN PATENT DOCUMENTS

| | | | | |
|---|---|---|---|---|
| FR | | 503396 A * | 6/1920 | ............ B64D 35/06 |
| FR | | 543471 A * | 9/1922 | ............ B64D 35/06 |
| FR | | 943553 A * | 3/1949 | ............ B64D 35/06 |
| WO | | 2010020199 A1 | 2/2010 | |
| WO | WO 2010/020199 A1 | | 2/2010 | |
| WO | | 2011023396 A2 | 3/2011 | |
| WO | WO 2011/023396 A2 | | 3/2011 | |

OTHER PUBLICATIONS

International Search Report and Written Opinion issued to International Patent Application No. PCT/US2013/076521, mailed May 27, 2014, 13 pages.

* cited by examiner

AIRCRAFT POWER PLANT

CROSS-REFERENCE TO RELATED APPLICATIONS

This application claims priority to U.S. Provisional Application Ser. No. 61/775,554, entitled "Aircraft Power Plant," filed Mar. 9, 2013, which is incorporated herein by reference in its entirety.

TECHNICAL FIELD

The present invention generally relates to aircraft power plants, and more particularly, but not exclusively, to aircraft power plants having separately operated bladed rotors.

BACKGROUND

Providing aircraft power plants capable of operating in a variety of conditions remains an area of interest. Some existing systems have various shortcomings relative to certain applications. Accordingly, there remains a need for further contributions in this area of technology.

SUMMARY

One embodiment of the present invention is a unique aircraft power plant. Other embodiments include apparatuses, systems, devices, hardware, methods, and combinations for providing motive power for an aircraft. Further embodiments, forms, features, aspects, benefits, and advantages of the present application shall become apparent from the description and figures provided herewith.

DETAILED DESCRIPTION

Figure 1:
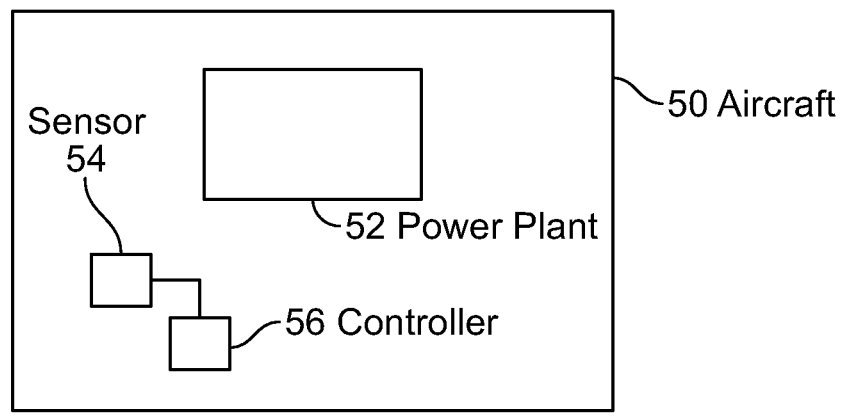
FIG. 1 depicts one embodiment of an aircraft and power plant.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an aircraft 50 is depicted having a power plant 52 capable of providing motive power to the aircraft 50. Though only one power plant 52 is depicted in the figure, other embodiments can include any number of power plants 52 arranged in any variety of configurations to provide power to the aircraft 50. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles.

The aircraft 50 can be flown at a variety of speeds and altitudes and in some embodiments can include a sensor 54 and controller 56 useful to enable flight. In one form the sensor 54 can be configured to measure aircraft flight condition such as speed and altitude, to set forth just two non-limiting examples, and can output any variety of data whether sensed or calculated. For example, the sensor 54 can sense and output conditions such as static temperature, static pressure, total temperature, and/or total pressure, among possible others. In addition, the sensor 54 can output calculated values such as, but not limited to, equivalent airspeed, altitude, and Mach number. Any number of other sensed conditions or calculated values can also be output. The sensor 54 provides data to the controller 56 and can output values in either analog or digital form.

The controller 56 is provided to monitor and operations of the power plant 52. The controller 56 can be comprised of digital circuitry, analog circuitry, or a hybrid combination of both of these types. Also, the controller 56 can be programmable, an integrated state machine, or a hybrid combination thereof. The controller 56 can include one or more Arithmetic Logic Units (ALUs), Central Processing Units (CPUs), memories, limiters, conditioners, filters, format converters, or the like which are not shown to preserve clarity. In one form, the controller 56 is of a programmable variety that executes algorithms and processes data in accordance with operating logic that is defined by programming instructions (such as software or firmware). Alternatively or additionally, operating logic for the controller 56 can be at least partially defined by hardwired logic or other hardware. In one particular form, the controller 56 is configured to operate as a Full Authority Digital Engine Control (FADEC); however, in other embodiments it may be organized/configured in a different manner as would occur to those skilled in the art. It should be appreciated that controller 56 can be exclusively dedicated to control of the power plant 52, or in other additional and/or alternative forms may further be used in the regulation/control/activation of one or more other subsystems or aspects of aircraft 50.

Figure 2:
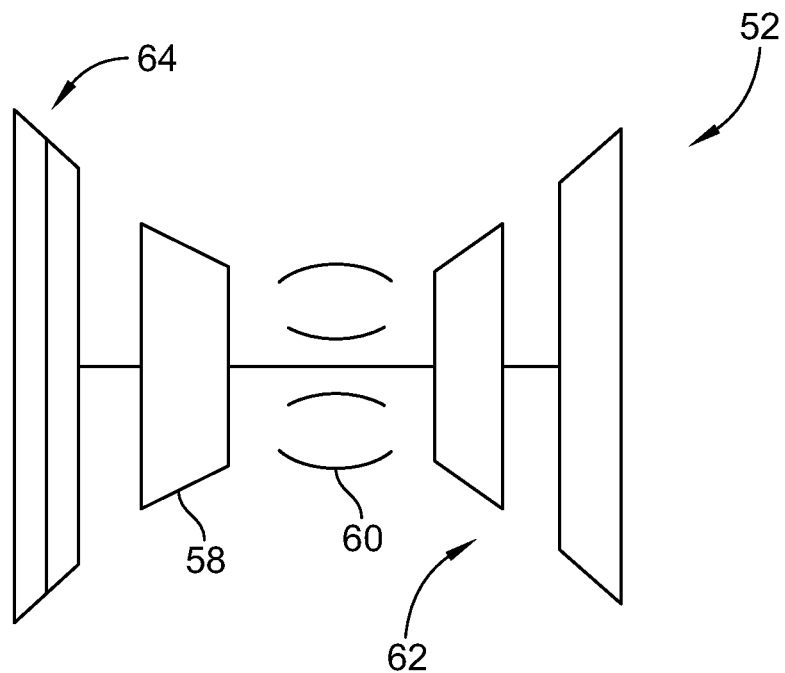
FIG. 2 depicts one embodiment of a work producing device.

Turning now to FIG. 2, one embodiment is depicted of the power plant 52 in which it takes the form of a gas turbine engine having a compressor 58, combustor 60, and turbine 62. The gas turbine engine can have multiple spools such as could be used with a turbine 62 that includes a high pressure turbine and a power turbine. The turbine 62 can be used to extract work from a passing flow stream and provide the work to a bladed rotor 64. The gas turbine engine can take a variety of forms as will be appreciated by those of skill in the art. In some forms the bladed rotor 64 is an open rotor or propfan.

Figure 3:
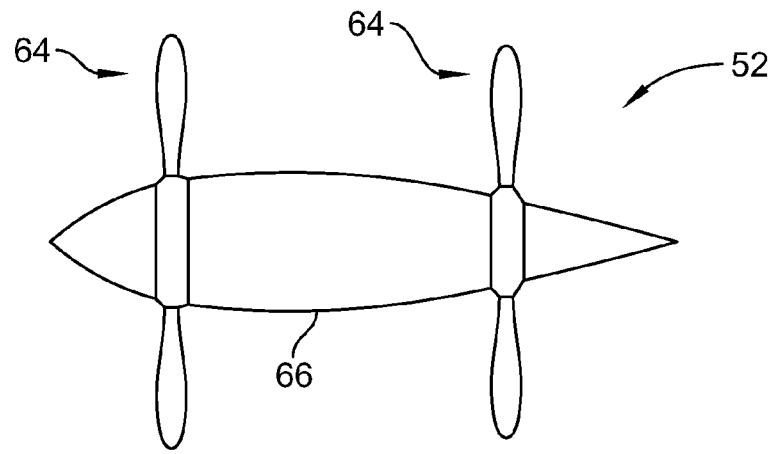
FIG. 3 depicts one embodiment of a power plant.

Turning now to FIG. 3, one embodiment is depicted of the power plant 52 having a pylon 66 and multiple bladed rotors 64 which in some embodiments are used to produce a motive force for the aircraft 50 (depicted in FIG. 1). The bladed rotors 64 can be configured to be contra-rotating in some non-limiting embodiments. The bladed rotors 64 can take a variety of forms, dimensions, shapes, etc. and can have any number of air moving members 68 distributed circumferentially about the bladed rotor 64. The air moving members 68 can have any variety of sweep, camber, twist, and stagger, suitable for use with the power plant 52, to set forth just a few non-exclusive examples. In some forms the air moving members 68 can be configured to have variable pitch provided by a suitable mechanism such as, but not limited to, a motor driven gearing. The air moving members 68 associated with any given bladed rotor 64, such as the upstream bladed rotor 64, can have the same characteristics/configuration as corresponding air moving members 68 associated with another bladed rotor 64, such as the downstream bladed rotor 64, but in some embodiments the characteristics and/or configuration can be different. Furthermore, although the illustrated embodiment depicts two bladed rotors 64 associated with the pylon 66, in some forms the aircraft 50 and/or power plant 52 can include any number of bladed rotors 64 with the pylon 66 having any variety of configurations and placements as described herein.

Although the non-limiting embodiment disclosed in FIG. 3 depicts the bladed rotors 64 on either side of the pylon 66, in some embodiments the rotors 64 can be spaced closer to one another. For example, both rotors 64 could be disposed at a downstream side of the pylon 66, while other embodiments could locate the rotors 64 at an upstream side. Other placements are also contemplated herein for any of the rotors 64.

Figure 4:
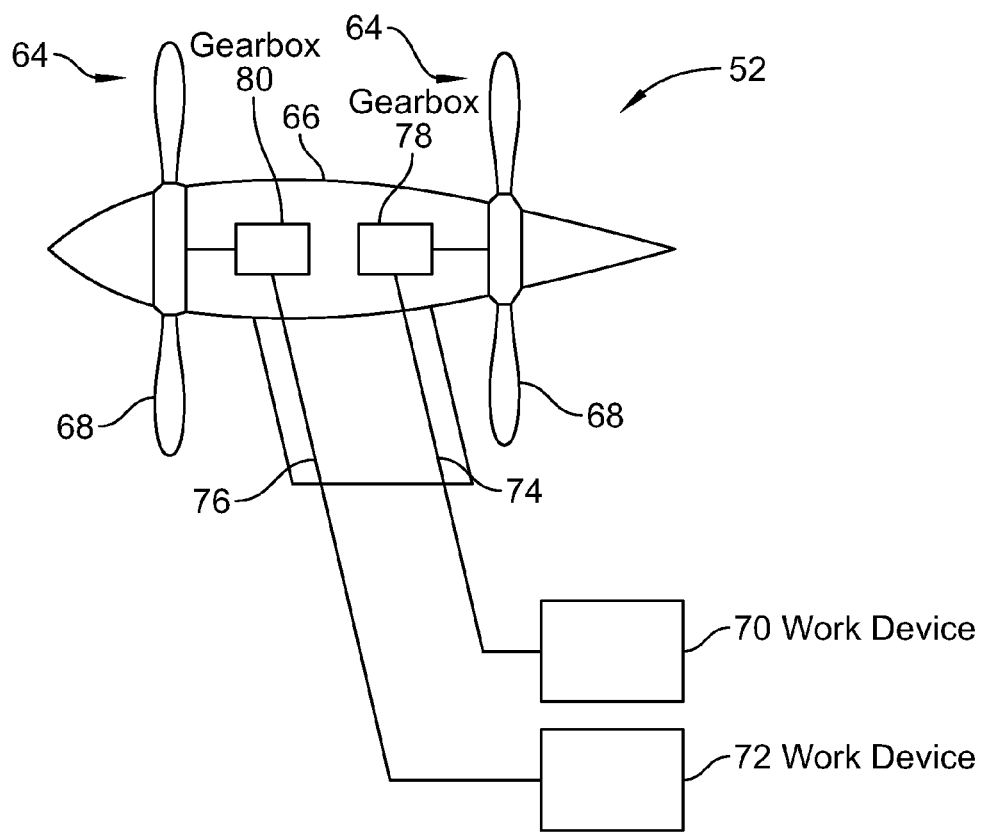
FIG. 4 depicts one embodiment of a power plant.

With reference to FIG. 4, and continuing reference to earlier embodiments, the bladed rotors 64 are capable of being separately powered by work devices 70 and 72. In one form the work devices 70 and 72 can be configured to independently drive the bladed rotors 64 at operating conditions that can be different in some modes of operation, or the same/similar in other modes of operation. For example, the work devices 70 and 72 can be operated either directly or indirectly to drive the bladed rotors 64 at different speeds. The work devices 70 and 72 can also provide varying levels of work to the bladed rotors 64. In one non-limiting form the air moving members 68 in an upstream bladed rotor 64 can be commanded to a different pitch than air moving members 68 associated with a downstream bladed rotor.

In some embodiments the aircraft 50 can be operated to produce varying speeds and/or configurations based upon a forward speed of the aircraft 50. In a low speed mode of operation the speed and/or configuration of the bladed rotor 64 can be adjusted to provide for an improved and/or optimized noise signature, such as might be useful in a take-off operation around a noise sensitive environment. In a high speed mode of operation the speed and/or configuration of the bladed rotor could also be adjusted to improve and/or optimize a performance of the aircraft 50.

In those embodiments which include the controller 56 and/or sensor 54, the controller 56 can determine appropriate speed and/or configuration of the bladed rotor 64 and command each work producing device 70 and 72 accordingly. In one form the sensor 54 can be used to determine a speed of the aircraft 50, the information of which is provided to the controller 56 to determine an appropriate speed of the each of the bladed rotors 64. The controller 56 can command an absolute speed and/or configuration of each bladed rotor 64, while in another form the controller 56 can command a relative speed and/or configuration. For example, the controller 56 is capable of generating a delta command to one or both of the bladed rotors based on a baseline command. In one further non-limiting example, the delta command can take the form of a command expressed as an increment to be summed with a baseline command. Such an increment can be expressed in the same units as the baseline command or as a percentage of it. In one form the baseline command can represent a command to be issued corresponding to one of the bladed rotors 64. In short, the controller 56 can operate each of the work devices 70 and 72 to provide for appropriate speed and/or configuration of the bladed rotors 64.

Also depicted in FIG. 4 are power transfer devices that can be used to convey power from each of the work devices 70 and 72 to their respective bladed rotors 64. In one non-limiting embodiment the power transfer devices can include a shaft driven by the work devices 70 and 72, such as by shafts 74 and 76. In the illustrated embodiment the shafts 74 and 76 are drivingly coupled to the bladed rotors 64 via gearboxes 78 and 80, but other embodiments need not include such a device. The gearboxes 78 and 80 can include any number of components useful in changing a direction and/or ratio of rotation of the shafts 74 and 76. In some forms the gearboxes 78 and 80 can be a transmission which in some forms can include a variety of mechanisms to change the ratio of rotation from either of the shafts 74 and 76 to the bladed rotors 64. Such a transmission can provide for a variety of ratios as will be appreciated. In still further alternative and/or additional forms the gearboxes 78 and 80 can include power modulators such as one or more clutches.

Though the illustrated embodiment depicts various shafts and gearboxes 78 and 80, some forms of the power plant 52 may not include such devices. To set forth just one non-limiting embodiment, in some forms the work devices 70 and 72 can be coupled directly to the bladed rotor 64, either through a shaft or similar device, and/or can be integrated thereto.

The work devices 70 and 72 can take a variety of forms in various embodiments. To set forth just a few non-limiting examples, one or more of the work devices 70 and 72 can be an internal combustion engine (such as but not limited to gas turbine engines and positive displacement engines) or an electric motor. The work devices 70 and 72 can be configured to operate on the basis of a fuel or energy storage and in some forms both work devices 70 and 72 can pull from the same fuel or energy storage. For example, if the work devices 70 and 72 were configured as internal combustion engines the devices can receive fuel from the same storage container, such as a vehicle fuel tank. In similar fashion, if the work devices 70 and 72 were electric motors, such motors can receive electrical power from a common source, such as a generator or battery. In other embodiments the work devices 70 and 72 can receive fuel or energy from separate sources, such as but not limited to separate fuel containers or separate sources of electricity. Other forms of work devices and fuel/energy storage can also be used suitable to any given application.

The work devices 70 and 72 can be the same type in any given embodiment of the power plant 52. For example, the devices 70 and 72 can both be gas turbine engines, or positive displacement engines, or electric motors. In other embodiments, however, the work devices 70 and 72 can take different forms, such as work device 70 in the form of an internal combustion engine and work device 72 in the form of an electric motor.

In some applications one or more of the work devices 70 and 72 can be an off-the-shelf device integrated into the power plant 52 with minimal to no changes. In other applications one or more of the work devices 70 and 72 can be modified either moderately or substantially before integration with the power plant 52. In still further forms one or more of the work devices 70 and 72 can be substantially reconstructed and/or be devices specifically designed for the application to be used in the power plant 52.

One aspect of the present application provides an apparatus comprising an aircraft power plant having a first work producing device and a second work producing device, and a first unducted air moving device in serial flow communication with a second unducted air moving device, the first unducted air moving device powered by the first work producing device and the second unducted air moving device powered by the second work producing device.

A feature of the present application provides wherein the first work producing device is one of an internal combustion engine and an electric motor, and the second work producing device is one of an internal combustion engine and an electric motor.

Another feature of the present application provides wherein the first work producing device is the same type of device as the second work producing device.

Still another feature of the present application provides wherein the first work producing device includes a turbine structured to extract energy from a passing flow stream.

Yet another feature of the present application provides wherein the turbine is downstream of a combustor, and wherein the first unducted air moving device is capable of rotating at a first rotational velocity and the second unducted air moving device is capable of rotating at a second rotational velocity.

Still yet another feature of the present application includes a controller structured to develop a command signal to the first work producing device.

A further feature of the present application provides wherein the controller includes a module configured to provide the command based upon a function of airspeed.

Another aspect of the present application provides an apparatus comprising an aircraft thrust producing device having a first power source including a first bladed device and a second power source including a second bladed device structured to convey a stream of working fluid, the first power source capable of generating power independent of the second power source, and wherein the first power source delivers power to the first bladed device to convey the stream of working fluid to the second bladed device, wherein the second bladed device is powered by the second power source.

A feature of the present application provides wherein the two bladed devices are open rotors.

Another feature of the present application provides wherein the first power source is one of an internal combustion engine and an electric motor.

Still another feature of the present application provides wherein the first power source is radially offset from an axis of rotation of the first bladed device.

Yet another feature of the present application provides wherein the first power source is coupled via a shaft to the first bladed device.

Still yet another feature of the present application provides wherein the first bladed device can be driven to a different velocity than the second bladed device.

A further feature of the present application includes a control system configured to generate a signal representative of velocity used to drive the first bladed device to a first velocity.

Yet another aspect of the present application provides an apparatus comprising an aircraft thrust producing system having a first unducted fan in flow communication with a second unducted fan, and means for independently driving the first unducted fan to a different speed than the second unducted fan.

A feature of the present application provides wherein the means further includes means for controlling the means for independently driving.

Still yet another aspect of the present application provides a method comprising operating an aircraft power plant to develop thrust, the operating including: rotating a first bladed air moving device to produce a first flow stream by action of a first power source, delivering the first flow stream to a second bladed air moving device powered by a second power source, independently driving each of the first bladed air moving device and second bladed air moving device from the first power source and second power source respectively.

A feature of the present application provides wherein the rotating includes spinning the first bladed air moving device as an open rotor.

Another feature of the present application includes providing power from the first power source to the first bladed air moving device, the first power source located radially offset from a rotation of the first bladed air moving device.

Yet another feature of the present application provides wherein the providing power includes rotating a shaft in mechanical communication with the first bladed air moving device.

Yet still another feature of the present application provides which further includes rotating a gearing coupled to the shaft and the first bladed air moving device.

A further feature of the present application provides wherein the first power source is one of an internal combustion engine and an electrical device.

A still further feature of the present application provides wherein the first bladed air moving device is capable of spinning at a different speed than the second bladed air moving device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    an aircraft power plant having a first work producing device and a second work producing device; and
    a first unducted air moving device and in serial flow communication with a second unducted air moving device, the first unducted air moving device powered by the first work producing device and the second unducted air moving device powered by the second work producing device, and
    a controller configured to develop a command signal based upon a function of airspeed, and
    wherein the first unducted air moving device is capable of rotating at a first rotational velocity, the second unducted air moving device is capable of rotating at a second rotational velocity, and the controller is configured to provide the command signal to one of the first work producing device and the first unducted air moving device to cause the first rotational velocity of the first unducted air moving device to be different than the second rotational velocity of the second unducted air moving device.

2. The apparatus of claim 1, wherein the first work producing device is one of an internal combustion engine and an electric motor, and the second work producing device is one of an internal combustion engine and an electric motor.

3. The apparatus of claim 2, wherein the first work producing device is the same type of device as the second work producing device.

4. The apparatus of claim 1, wherein the first work producing device includes a turbine structured to extract energy from a passing flow stream.

5. The apparatus of claim 4, wherein the turbine is downstream of a combustor.

6. The apparatus of claim 1, wherein the controller is configured to command a relative speed between the first unducted air moving device and the second unducted air moving device.

7. The apparatus of claim 6, wherein the first undcuted air moving device comprises an open rotor, the first power source comprises an electric motor, the first power source is radially offset from an axis of rotation of the first unducted air moving device, and the first power source is coupled via a shaft to the first unducted air moving device.

8. An apparatus comprising:
an aircraft thrust producing device having a first power source, a first bladed device structured to convey a stream of working fluid, a second power source, and a second bladed device, the first power source capable of generating power independent of the second power source; and
a control system configured to drive the first bladed device to a first speed that is different than a second speed of the second bladed device based upon a function of airspeed,
wherein the first power source delivers power to the first bladed device to convey the stream of working fluid to the second bladed device, wherein the second bladed device is powered by the second power source.

9. The apparatus of claim 8, wherein the bladed devices are open rotors.

10. The apparatus of claim 8, wherein the first power source is one of an internal combustion engine and an electric motor.

11. The apparatus of claim 10, wherein the first power source is radially offset from an axis of rotation of the first bladed device.

12. The apparatus of claim 11, wherein the first power source is coupled via a shaft to the first bladed device.

13. The apparatus of claim 8, wherein the controller is configured to command a relative speed between the first bladed device and the second bladed device.

14. The apparatus of claim 13, wherein the first bladed device comprises an open rotor, the first power source comprises an electric motor, the first power source is radially offset from an axis of rotation of the first bladed device, the first power source is coupled via a shaft to the first bladed device, and the second power source comprises a gas turbine engine.

15. A method comprising:
operating an aircraft power plant to develop thrust, the operating including:
rotating a first bladed air moving device at a first rotational speed to produce a first flow stream by action of a first power source;
rotating a second bladed air moving device at a second rotational speed to produce a second flow stream by action of a second power source;
delivering the first flow stream to the second bladed air moving device;
independently driving each of the first bladed air moving device and second bladed air moving device from the first power source and second power source respectively to cause the first rotational speed to be different than the second rotational speed based at least in part on airspeed.

16. The method of claim 15, wherein the rotating includes spinning the first bladed air moving device as an open rotor.

17. The method of claim 15, which further includes providing power from the first power source to the first bladed air moving device, the first power source located radially offset from a rotation of the first bladed air moving device.

18. The method of claim 17, wherein the providing power includes rotating a shaft in mechanical communication with the first bladed air moving device.

19. The method of claim 18, which further includes rotating a gearing coupled to the shaft and the first bladed air moving device.

20. The method of claim 15, wherein the first bladed air moving device comprises an open rotor, the first power source comprises an electric motor, the first power source is radially offset from an axis of rotation of the first bladed device, and the first power source is coupled via a shaft to the first bladed device.

* * * * *